July 4, 1950      P. A. SHAW      2,513,370
DRIER OF THE FLUID CURRENT TYPE
Filed March 18, 1947      2 Sheets-Sheet 1
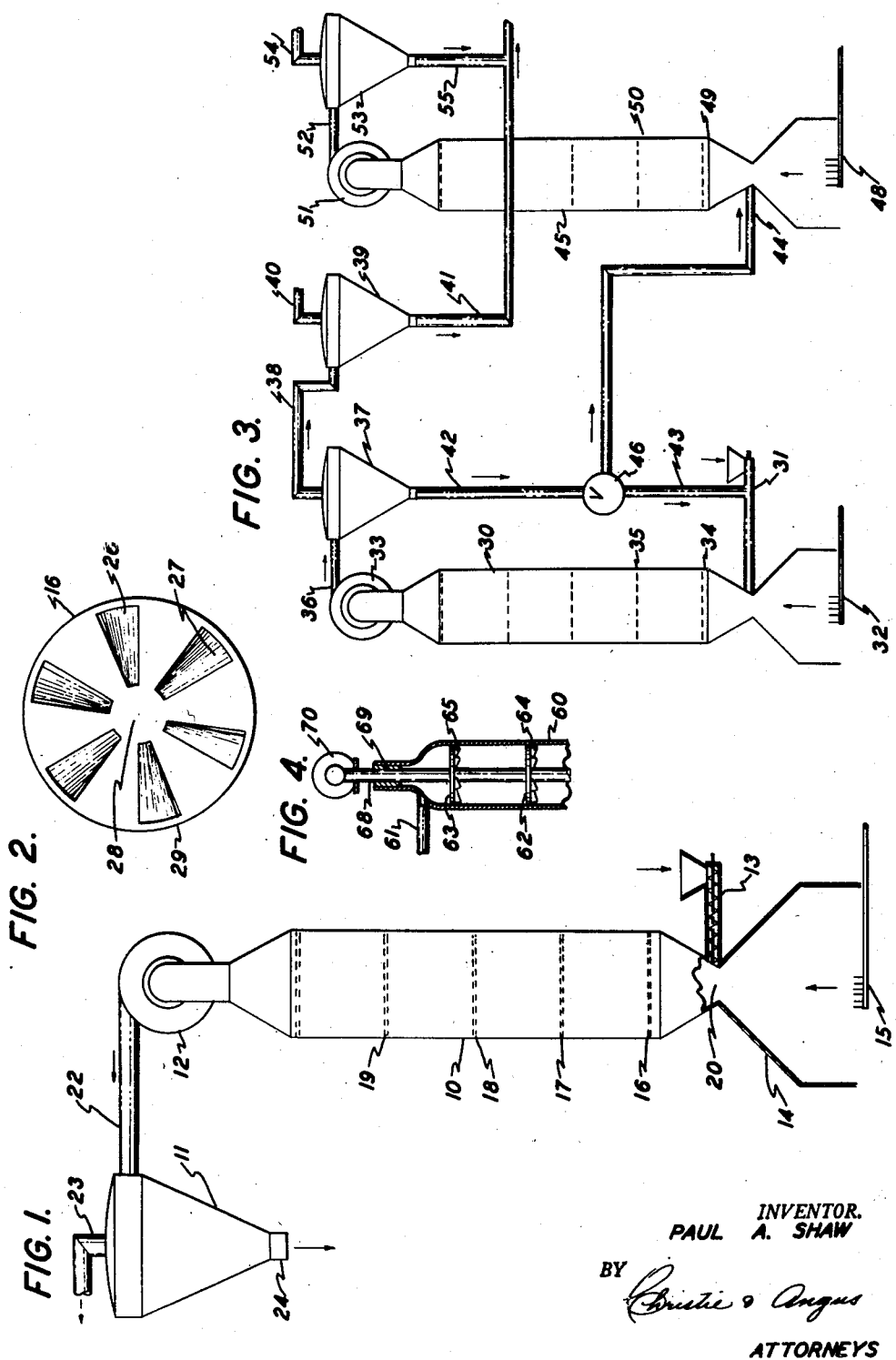
INVENTOR.
PAUL A. SHAW
BY
ATTORNEYS July 4, 1950　　　　　　　P. A. SHAW　　　　　　　2,513,370
DRIER OF THE FLUID CURRENT TYPE
Filed March 18, 1947　　　　　　　　　　　　2 Sheets-Sheet 2

INVENTOR.
PAUL A. SHAW
BY
ATTORNEYS

Patented July 4, 1950

2,513,370

UNITED STATES PATENT OFFICE 2,513,370

DRIER OF THE FLUID CURRENT TYPE

Paul A. Shaw, San Pedro, Calif., assignor to Terminal Island Sea Foods, Ltd., Terminal Island, Calif., a corporation of California Application March 18, 1947, Serial No. 735,511

5 Claims. (Cl. 34—57)

This invention relates to drying relatively light finely divided material. More particularly, the invention relates to drying those materials which tend to alter or deteriorate at high temperatures and provides improvements in methods and apparatus for such drying. In one aspect, the invention provides improvements in the drying of pulps composed of light finely divided solids and a large proportion of water, say 80% or more, to the end that the water is removed simultaneously by thermal and mechanical action, the result being an exceedingly efficient operation in terms of energy input.

The drying apparatus and methods herein set forth are applicable generally to the dehydration of finely divided or pulverized solids of relatively low bulk density, say in the neighborhood of 1 or less, and offer advantages in the treatment of a great variety of material, including those which are unaltered at relatively high temperatures. The invention is particularly suited however, to the drying of products such as fish meal, peat moss, rice, vegetable chips, sewage sludge, wood pulp and other materials which tend to deteriorate if dried at excessive temperatures or even if dried slowly at moderate temperatures, and particularly to such products when their initial moisture content is very high.

Fish meal, for example, is used extensively as a poultry feed, fertilizer and the like, and is made by cooking, pressing and disintegrating fish or fish scraps and drying the resultant pulp. The pulp consists of fragments of both bone and flesh, which tend to deteriorate markedly in the heretofore customary drying operations. Operating problems involved in fish meal drying, especially as conducted in rotary driers and the like, include severe odor nuisance, marked fire hazard, low thermal efficiency and scorching or burning of fat particles with consequent impairment of the quality and yield of the product. Product problems include poor color, diminished food and vitamin contents, a tendency to cake and harden upon cooling, uneven moisture content, and a tendency towards spontaneous combustion, the latter being attributable to the oxidization of drying oils initiated in the drying operation and continuing in the stored product.

As a result of my investigations, I have developed apparatus for and methods of drying fish meal and other similar products with which many or all of the above difficulties are encountered in conventional drying methods. My invention solves the operating problems of drying with consequent reduction in operating costs. The practice of the invention results in a higher total yield of improved fish meal or other materials. At the same time, the product possesses better color, more uniform moisture content, higher food value in those cases in which the product is used for food, and less tendency to combust spontaneously or to cake during storage.

As I have indicated, the invention affords outstanding advantages in the drying of materials such as peat moss and sewage sludge, which are characterized not only by their light weight, combustible character, and finely divided condition, but also by a very high initial moisture content. Thus, peat moss frequently contains, as received at the drying operation, from 85% to 90% moisture, and sewage sludge recovered in a filtration operation and sent to drying, contains from 80% to 95% moisture. Because of such high moisture content and the low permissible treatment temperature dictated by the perishable nature of the solids, drying by conventional methods often has proved to be uneconomic. In one aspect of my invention, however, moisture is removed simultaneously by evaporation and also physically as a mist or fog or liquid particles, to the end that, considered solely as an evaporation operation, the process of the invention has been operated with a thermal efficiency in excess of 200%.

In accordance with my invention, I entrain the solids to be dried in a rising stream of unsaturated, i. e. "dry" gas and force the resulting stream to pass upward through a column while imparting a swirling motion to the stream. Preferably, but not always necessarily, the dry gas is artificially heated prior to contact with the wet solids.

It is desirable to cause the solids to lag the gas in the ascending stream, and this is preferably accomplished by causing the stream to swirl first in one direction and then in another as it rises. Thus the stream may first swirl clockwise and then counter-clockwise.

In furnishing means for causing the warm gases to flow upwardly in the tower, I may induce a positive pressure differential between the bottom and the top of the tower either by introducing the hot gases to the bottom of the tower under a pressure in excess of atmospheric and withdrawing them at the top of the tower at atmospheric pressure or below; or I may introduce the gases at the bottom of the tower under atmospheric pressure and take suction by a blower or the like on the top of the tower to create a partial vacuum therein. In general, I have found that this latter method is the preferred one inasmuch as the reduced pressure within the tower increases the efficiency of the operation by virtue of the resultant increase in the rate of evaporation of moisture from the material to be dried. Moreover, the operation is more convenient, since the suction aids in feeding of the wet material.

The efficiency of the operation is increased markedly if it is so conducted that there is a pronounced lag between the speed of the gas and the speed of the solids passing through the tower. This can be accomplished advantageously by changing the direction of swirling one or more times in the tower. For example, swirling in a clockwise direction may be induced in the bottom of the tower, the swirling being reversed abruptly to counter-clockwise at a point somewhat above the bottom, etc. The effect of this reversal is to delay the solids and to allow the water-laden gases to leave them behind.

The swirling, with or without reversal, may be brought about in several ways. I prefer to induce swirling by placing in the lower one above the other a series of transverse baffles provided with radial vanes, so slanted with respect to the central axis of the tower that the gas, in passing through the baffles, is induced to swirl. Reversal of swirling is accomplished by reversing the slant of the vanes.

Additional features and advantages will become apparent from the following detailed description and the accompanying drawing in which:

Fig. 1 is a diagrammatic view of one embodiment of the apparatus;

Fig. 2 is a plan view of a vane type baffle which may be disposed within the drying column;

Fig. 3 is a diagrammatic view of a drying apparatus according to the invention in which two drying columns are employed in series;

Fig. 4 is a fragmentary view of a drying column in which baffles are mounted on a centrally disposed rotatable shaft;

Figure 5:
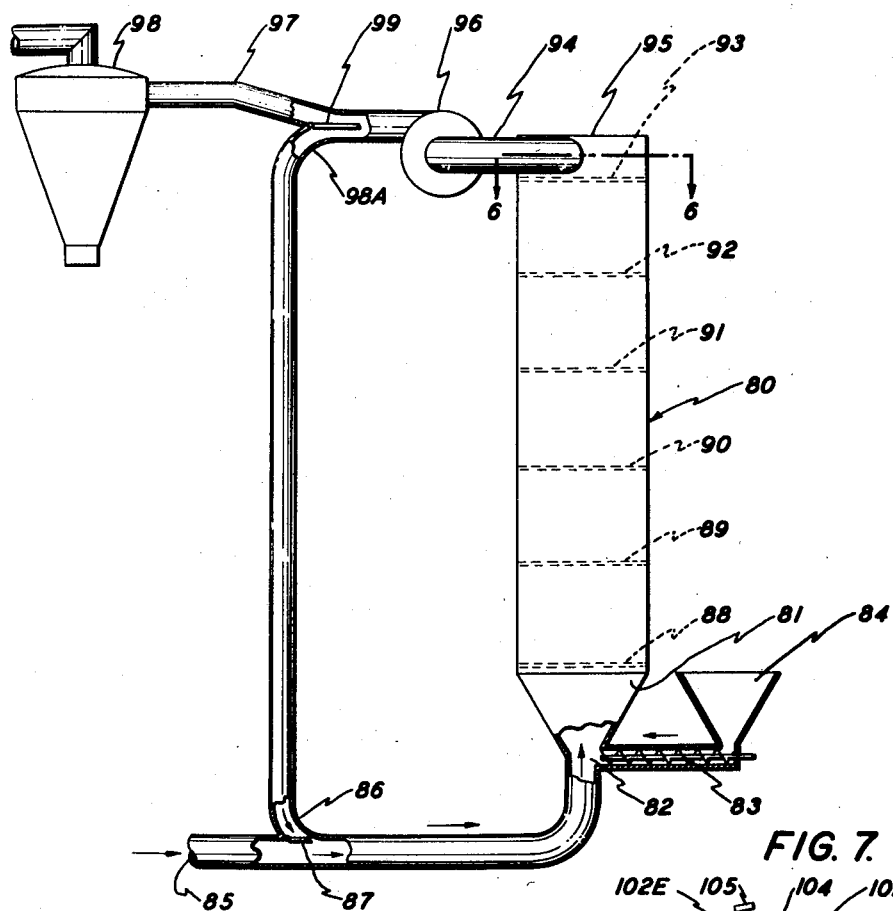
Fig. 5 is an elevation, partly in section, through another drying column installation in accordance with the invention.

Referring to Fig. 1, the apparatus has a vertical tower or column 10, a separator 11 of the cyclone type, a blower 12 located at the top of the column or shaft 18 and conveying means 13 communicating with the lower portion of the column 10.

Numerous means may be provided for introducing hot combustion gases to the bottom of the column, one such means being shown in Fig. 1. In this embodiment, the lower portion of the column 10 is flared to form a hood-like structure 14 into which a burner element is introduced. The hot gases generated by the burner element 15 are discharged into the hood 14 and from thence into the main portion of the column 10.

Baffles 16, 17, 18, etc., are shown in section within the column disposed between the point of introduction of the material to be dried and the blower 12.

To insure the initial suspension of the moist material introduced to the column by the conveying means 13, the column 10 is provided with a constriction 20 at the point of introduction so as to increase the velocity of the gases flowing from the burner 15 upwardly in the column at this point Communicating between the blower 12 and the separator 11 is the transfer line 22 which carries the gases and suspended material from the top of the column 10 into the separator 11. This separator may be of any desired type such as a conventional settling chamber, a cyclone separator, as shown, or the like. In the separator, the gases are taken off by means of line 23 and the dried or partially dried solids are removed from the bottom 24.

In order to protect the blower from the action of the solids, for example an abrasive or corrosive action, the position of blower and separator may be reversed, i. e. the cyclone may be placed ahead of the blower rather than behind.

In Fig. 2 there is shown a plan view of one type of baffle such as the baffle 16, 17, 18, etc., which may be employed within the column 10. This particular baffle element comprises a plurality of vanes 26, 27, etc., affixed to a centrally located hub 28. The whole device being supported in the framework 29 which is affixed to the inside walls of the column 10. In the baffle as shown in Fig. 2 the vanes 26, 27, etc., exhibit such a pitch that the baffle will induce a counter-clockwise rotational motion in the ascending gases as they impinge thereon. Whereas each and all of the baffles disposed in the column 10 may be identical and therefore induce unidirectional rotational motion to the ascending gases flowing through the baffles, I have found that a greater degree of lag between gas and solids is obtained by providing the alternate baffles with vanes having opposite directions of pitch so that the alternate baffles will cause the rotation or whirling motion of the gases in the opposite or clockwise direction. Thus, in the Fig. 1, for example, baffles 16, and 18, etc., may be identical to that shown in Fig. 2 wherein these baffles will induce counter-clockwise motion of the gases and the alternate baffles 17 and 19, etc., may be provided with the opposite pitch so as to impart the opposite swirling motion to the ascending gases.

Although the radial vanes may take a number of forms, I have found it desirable in several cases to set them at 45° or more from the horizontal and in some cases to employ an angle of as much as 60° with the horizontal. Again, the degree of constriction offered by the baffles may be varied over a considerable range, and the optimum will depend upon the nature of the material being dried. In several cases I have found that excellent results are obtained if the vane area is more than half of the total cross section of the tower. Thus the openings in the baffle from which the vanes project may constitute as much as 60% to 75% of the cross section of the tower at the point where the baffle is disposed.

The vanes of each baffle may be provided with differing pitches whereby turbulence will be induced as the gases pass through the baffles.

One of the salient features of the invention is the simplicity of operation thereof. Thus in the apparatus as shown in Fig. 1, warm gases are generated by the burner 15 and are caused to flow upwardly at an appreciable velocity through the column 10 by means of the blower 12 which takes suction on the column and discharges into the transfer line 22 which communicates with the separator 11. After the gas flow through the system is established the conveyor element 13 is placed in operation and the moist pulverized material to be dried, which may be fish meal, peat moss, vegetable chips or the like, is introduced into the constricted portion 20 of the column 10. The ascending gases pick up the material to be dried, and the suspension thereof passes upwardly in the column under the influence of the reduced pressure therein induced by the blower 12. In passing through the column, the suspension has first to pass through the baffles 16, 17, 18, 19, etc., and the lag between gas and solids thereby induced further increases the efficiency of the drying.

Upon reaching the upper portion of the column, the suspension is discharged by the blower 12 into the transfer lines 22 and into the cyclone separator 11. In the separator the solids are separated from the gases, the latter being withdrawn by means of line 23 from the separator and the former being withdrawn from the bottom of the separator at the point 24.

If the apparatus is constructed with alternate baffles of opposite pitch, the turbulence thereby induced by the rising stream apparently brings into play an additional drying effect, in that a substantial proportion of the liquid accompanying the solids is dispersed in the gas as a fog or mist. This mist is carried upward by the gas faster than the solids, and so is separated therefrom. It is of such character that it will not be dropped in the cyclone or other separator, and so it can be permanently removed.

The nature of the material to be dried may make desirable various modifications in the above described operation, and the flexibility possible from the apparatus shown constitutes an additional feature and advantage of my invention. Thus in one alternative method of operation, the velocity of the gas stream, traveling through the column 10 may be so controlled as to carry over into the transfer line 22 only that material which is dried while allowing sufficient slippage in the ascending gas stream of the material which is not yet dry so as to increase its residence time within the column whereby complete drying is insured. This method of operation is made possible by the difference in bulk density of the dry material and the moist material, and this difference in bulk density can be taken advantage of by controlling the velocity of the gaseous flow through the column. It is of course evident that this control of the gaseous velocity may be accomplished either by the blower 12 located at the top of the column taking suction thereon or by a similar blower located at the bottom of the column discharging the warm gases into the column under a positive pressure. In either case, the velocity control is equally effective. However, as a result of the increased relative vapor pressure of the moisture within the material to be dried, I have found that the most efficient drying is accomplished when the column is operated under a partial vacuum which is accomplished by taking suction at the top thereof by means of suitable apparatus such as the blower 12. Another desirable feature of this type of apparatus is the resultant ease of feeding the material to be dried into the column when it is maintained at less than atmospheric pressure.

In an additional method of operation, the apparatus may be provided with two or more separators such as the cyclone separator 11. When a plurality of separators is employed, the entire quantity of material to be dried together with the carrier gas may be discharged into the initial separator. This initial separator is operated under such conditions that the gaseous stream withdrawn by means of line 23 contains in suspension therein the material which is completely dried, and this suspension of dried material in the gas stream may be introduced into a second separator wherein the dried material is separated from the gas as hereinbefore described with relation to the separator 11. In such operation, there is obtained in the initial separator a separation between the dried material, which is carried along with the gas stream, from the undried material which may be withdrawn from the initial separator and returned to the conveying system 13 to be recycled through the column 10.

A similar effect may be accomplished by providing a pair of columns such as column 10 in association with the above described plurality of evaporators. In such case the undried or partially dried material recovered from the initial separator will be introduced into a second drying column such as column 10 also provided with a separator for separating the material dried in the second column from the gases flowing therethrough. Such a two column operation becomes desirable when the load upon a single column is so great as to reduce the efficiency of the drying operation.

An apparatus for accomplishment of the above described procedure is shown diagrammatically in Fig. 3. In the drawing, the material to be dried is introduced into the first column 30 by means of the feeder 31. Hot gasses generated by the burner 32 are drawn upwardly within the column 30 by the blower 33 and in so doing are caused to carry the materials to be dried upwardly in the column through the baffles 34, 35, etc. The gases and suspended solids are discharged by blower 33 through the transfer lines 36 into a first separator 37. The separator 37 is so operated that the gases and dried material are carried overhead through line 38 into a second separator. In the separator 39, the dried material is separated from the carrier gas which is withdrawn from the separator 39 by means of line 40. Thed ried material is withdrawn from the bottom of the separator 39 by means of line 41.

In separator 37, as above described, the dried material and carrier gases are withdrawn through line 38. The undried material or only partially dried material which is separated from the dried material and gases in the separator 37 is removed therefrom by means of line 42 from whence it may be returned to the feeding means 31 in association with column 30 through line 43 or to feed 44 of a second column 45. The flow of the undried or partially dried material from line 42 is controlled by means of the valve 46.

If the undried material is introduced to column 45 by means of the feeding element 44, hot gases are generated by the burners 48 and are caused to flow upwardly within the column through the baffles etc. and to carry the material introduced therein to the top of the column whereafter they are discharged by the blower 51 through transfer lines 52 into the separator 53. In the separator 53 the gases are separated and withdrawn by means of line 54 from the dried solids which are removed from the separator by line 55 joining with the dried material discharge from the separator 39 by means of line 41.

It may be found to be desirable to accomplish the drying operation in a plurality of columns wherein the material dried in each column is separated along with the gas stream, and only that material which is left only partially dried is fed into the second, third or fourth column. Although this means of operation and the apparatus necessary thereto may represent a somewhat greater initial investment, this undesirable feature may be compensated for by an increased capacity and efficiency of the drying plant. Thus the initial tower 10 could be operated at a considerably higher gaseous velocity and thus a considerably higher rate of solid feed while the subsequent columns may be decreased in size because of the decreased load thereon. Thus as each increment of dried material is removed from the total body of the material from a separator such as separator 11, the partially dried material withdrawn from each successive separator will represent a smaller and smaller proportion of the total feed in the initial column. The second, third, fourth, etc. columns, however, many may be desired, may thus be progressively smaller and smaller in dimensions in proportion to the decrease in load required.

Perhaps the simplest means of forming warm gases and introducing them to the bottom of the drying column is represented in Fig. 1 by a burner located directly beneath the column in a hood 14 formed by the flaring of the bottom end of the column, and it is to be understood that any means may be employed for introducing these gases into the column. Thus the bottom of the column directly below the constricted portion 20 may be substantially closed except for inlet means leading directly from a source of warm gases, which source may represent or comprise a burner such as burner 15 located in a hood such as hood 14 remote from the column 20 or an apparatus comprising a boiler in which gases are warmed by steam or the like. In short, any means of supplying warm gases to the column 10 may be employed.

If the column is provided with the blower 12 located at the top thereof whereby suction is taken on the column, no positive feed means will be required to introduce the warm gases into the bottom of the column, inasmuch as the partial vacuum developed by the blower 12 will be sufficient to draw the gases into the column. However, if the blower 12 is not employed, it will be necessary to provide a blower in the gas inlet line at the bottom of the column in order to provide a positive pressure differential between the bottom and the tops of the column.

Alternatively, I may employ both a blower located at the top of the column and a blower located at the bottom of the column, the latter discharging into the column and the former taking suction on the column. Such a cooperating system of two blowers may be particularly desirable in a drying apparatus in which there is employed a plurality of drying columns in order to obtain a satisfactorily high gaseous velocity through the first or largest column.

In an alternative means of accomplishing the flow of warm gas through the column, the baffles disposed therein may be mounted on a centrally disposed rotatable shaft. By providing these baffles with vanes and causing them to rotate by rotation of the shaft, the necessary pressure differential and gas flow may be effected either with or without the addition of an auxiliary blower.

Such an apparatus is shown in the fragmentary view of Fig. 4 and includes a colum 60 provided with the transfer line 61, and baffles 62 and 63. The baffles 62 and 63 are provided with vanes 64, 65, etc. and are mounted on the centrally disposed shaft 68. The shaft 68 passes through the top of the column 60 through a pressure seal gasket or stuffing box 69 and is connected to power means such as motor 70 by which it is rotated. As above described, the rotation of the baffles which are, in effect, propellers causes the necessary pressure differential between the bottom and the top of the column to maintain the gas flow therein.

Figure 6:
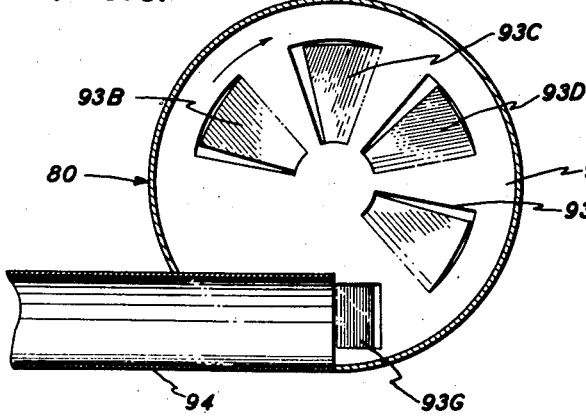
Fig. 6 is a horizontal section through the column of Fig. 5 taken along the line 6—6 and illustrating a tangential discharge means.

Fig. 5 illustrates a simple form of the apparatus of the invention adapted to recirculate any desired quantity of solids through the drying tower. Referring to this figure and to Fig. 6, it will be observed that a tower 80 of cylindrical section is provided with a hopper shaped bottom 81 so that there is a constricted inlet 82. A screw conveyor 83 feeds peat moss or the like from a bin 84 to the side of the inlet.

Primary hot air from a source (not shown) is sucked in through a pipe 85. A branch pipe 86 for return of some solids and gas enters the main pipe 85 from above at a Y. A hinged damper 87 is disposed at the juncture of the two pipes and by regulating its position, more or less material and gas may be returned to drying.

Within the tower proper there is a series of radially vaned baffles 88, 89, 90, 91, 92. As viewed from above, the lowest baffle 88 has its vanes so set that clockwise swirling or rotation is imparted to the rising stream of solids and gas. The next lowest baffle 89 is arranged with its vanes in the reverse direction so that the direction of rotation is reversed as the stream passes through this baffle. Alternate baffles all the way up the tower reverse the direction of flow.

A top baffle 93 of somewhat different construction is provided in order that the stream may be diverted into an outlet pipe 94 in a tangential direction. The baffle 93 is seen in plan in Fig. 6. It comprises a circular plate 93A. Radial vanes 93B, 93C, 93D, 93E cause the stream passing through the baffle to be whirled in a circular path. However, the last vane 93G immediately in front of the tangentially disposed outlet pipe 94 is rectangular rather than pie-shaped in plan, so that a change of direction is imparted to the whirling stream at this point to facilitate withdrawal through the outlet pipe 94.

It will be noticed that in the apparatus of Fig. 5, the top 95 of the tower is flat to facilitate the tangential withdrawal.

In the outlet pipe immediately adjacent the top of the tower is a blower 96, the outlet of which is Y-shaped and has two branches. The upper one 97 passes to a conventional cyclone collector 98, with the lower one 98 bending down and connecting to the return pipe 86. An adjustable damper 99 is hinged at the apex of the Y and may be adjusted to regulate the proportion of return to the tower.

In the operation of the apparatus of Figs. 5 and 6, wet peat moss or the like is fed into the constricted lower portion of the tower by the screw conveyor. The entering feed is suspended in the rising current of warm air and carried upward in the tower. The first baffle imparts a clockwise swirling motion to the stream. This is reversed by the second baffle 89, and the motion again becomes clockwise at the baffle 90, and so on until the top of the tower is reached. At this point, the baffle 93 diverts the stream of gas and solids into the tangential outlet pipe.

As the mixture of feed and hot air rises in the tower, two actions take place. The first is a simple drying effect whereby moisture from the feed is evaporated by the hot air. The second is a mechanical one wherein liquid accompanying the feed is atomized and rises as small droplets in the hot air. Because of the effect of the baffles, there is a substantial lag between solids and gas, i. e. the gas velocity through the dryer is higher than the velocity of the partially dried solids.

The stream leaving the top of the dryer is a mixture of wet gas with a fog of liquid particles plus suspended solids. This mixture passes through the blower and encounters the Y immediately ahead of the cyclone collector. If a single pass operation is to be conducted, the lower leg 98 of the Y is closed off completely by the damper. However, if circulation of some of the solids is required, the damper 99 is set so that the avenue to the return pipe 86 is partly open. In such case, some of the solids will enter the lower leg 98 of the Y and drop down the vertical return pipe 86 to be picked up in the stream of primary air or gas entering through the pipe 85 and thus be sucked back into the drying column. The upper damper has its principal effect in controlling the amount of solids recirculated, the lower damper 87 has its principal effect in controlling the amount of gas which accompanies the recirculated solids.

The following table gives results obtained with two classes of material treated in a dryer designed in accordance with Figs. 5 and 6. Thus sewage sludge (from a drum filter) and peat moss were treated in such a dryer under conditions indicated in the table.

|  | Sewage Sludge | Peat Moss |
|---|---|---|
| Initial Water Content | 80–95% | 85–90% |
| Final Moisture content after 2 passes through dryer | 50–60% | 25–30% |
| Air In. Relative Humidity | 15% | 15% |
| Temp. °F | 130° | 130° |
| Air Out. Relative Humidity | 30% | 30% |
| Temp. °F | 90° | 90° |

In all cases, the material was sent through the dryer twice on the average. As indicated, the air entered the dryer at a very low temperature, despite which fact a substantial drying effect was obtained.

In the case of both the sewage sludge and the peat moss, it was determined that the moisture removed was more than twice the amount that would be expected from thermal effect alone. In other words, the apparatus viewed simply as an evaporater, had an efficiency in excess of 200%. This means of course that at least half of the moisture was removed without being evaporated at all i. e. as a mist.

Considerable drying can be obtained without heating the primary air at least slightly, because otherwise certain materials in particular sewage sludge and peat moss, tend to mat on the baffles and eventually to clog the apparatus. With more granular materials, however, such for example as wet sawdust, adequate drying can be accomplished without artificially heating the entering gas at all.

As indicated by the table, two passes through the apparatus were sufficient to reduce the moisture content of sewage sludge by 50% or 60% by weight. The drying efficiency in the case of peat moss was somewhat higher, since the moisture content dropped to 25% to 30%.

The sewage sludge, after the two-pass drying operation and containing 50% to 60% moisture, was again run through the tower several times with a slightly higher gas temperature, and it was discovered that the moisture content could be dropped to 10% without difficulty.

Figure 7:
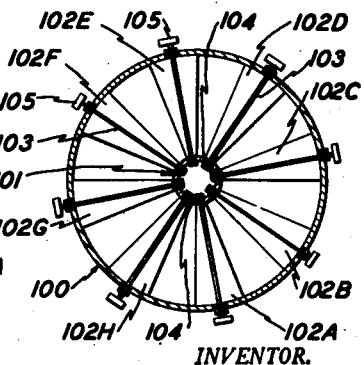
Fig. 7 is a horizontal section through a modified drying column of my invention illustrating adjustable baffles plus means for employing them as radiators to inject additional heat to the apparatus.

Fig. 7 illustrates two important modifications of the apparatus of the invention. The first is a means for adjusting vane angle during operation so that optimum conditions can be obtained for the particular product being dried. The second permits additional heat to be introduced into the dryer, employing the vanes themselves as radiators for the heat. Thus Fig. 7 is a cross sectional plan through a preferred drying tower of the invention defined by an outer drum 100. A central pipe 101 passes up through the tower vertically and this is heated by steam or any other suitable medium, say hot water or an electrical heating element. A plurality of pie-shaped vanes 102A, 102B, 102C, 102D, 102E, 102F, 102G, 102H are fastened rigidly to horizontal radially disposed rods or pipes 103, of which only one is shown. These rods are journaled in nipples 104 welded or otherwise fastened to the central pipe and project through the shell 100, being provided at their outside end with operating handles 105 which also indicate the angular position of the interior vanes.

The vanes may be adjusted individually or collectively to any desired angle so that they induce either clockwise or counterclockwise flow. Moreover, the vanes at a given elevation may be adjusted differently to create a particularly desirable condition of turbulence for a given material.

In the apparatus illustrated in Fig. 7, the drum has a diameter of 6 feet and the central pipe is of 12 inch diameter. The hubs 103 to which the several vanes are fastened are made conveniently from 1-inch pipe, and there are eight vanes at each level, these being 14 inches wide adjacent the drum.

When a series of vanes are employed at different levels, each set should be staggered with respect to the adjacent set, i. e., the plates of one set are disposed below the openings between an adjacent set.

Since the vanes are of heat conductive material and connected in heat conductive relationship with the central pipe, they become heated and radiate this heat to the current of gas and material to be dried passing upwardly through the column or drum.

Many modifications in the apparatus of the invention and in the method of employing the apparatus for the drying of fish meal, peat moss, wood pulp or the like will occur to those skilled in the art without departing from the scope of the foregoing description or of the following claims.

I claim:

1. In a drier, the combination which comprises an upright tower having a lower portion in which cross section increases with height, feed means for introducing the material to be dried into said portion, means for introducing dry gases into the tower below the feed means, a stationary baffle having radial vanes with openings therebetween disposed across the tower cross section above said portion, and means for imparting an upward movement of the gas through the tower, so that the material is carried upward by the gas and eventually through the baffle.

2. In a drier, the combination which comprises an upright tower having a lower portion in which cross section increases with height, feeder means for introducing the material to be dried into said portion, means for introducing dry gases into the tower below the feeder means, a stationary baffle having radial vanes with openings therebetween, the vanes being rotatable on the respective radii so that their angles with respect to the horizontal may be adjusted, the baffle being disposed across the tower cross section above said portion, means for holding the vanes at the chosen angles, and means for moving the gas upward through the tower so that the material is carried upward by the gas and eventually through the baffle.

3. In a drier, the combination which comprises on upright tower having a lower portion in which cross section increases with height, feed means for introducing the material to be dried into the portion, means for introducing dry gases into the tower below the feed means, a plurality of stationary baffles spaced one above the other across the tower cross section above said portion, each baffle being provided with radial vanes with openings therebetween, and means for imparting an upward movement of the gases through the tower, so that the material is carried upward by the gases and eventually through the baffles.

4. In a drier, the combination which comprises a tower having a downwardly tapering interior open portion, feed means for introducing material to be dried into said portion, means for introducing dry gas into the portion below the feed means, a stationary baffle having radial vanes with openings therebetween disposed across the tower above said portion, and means for moving the gases upward through the tower, so that the material is carried upward by the gases and eventually through the baffle.

5. Apparatus according to claim 4 provided with a tube disposed within the tower and connected to the baffle in heat conductive relationship therewith, and with means for heating the tube so that the baffles act as heat radiators.

PAUL A. SHAW.

REFERENCES CITED

The following references are of record in the file of this patent:

UNITED STATES PATENTS

| Number | Name | Date |
|---|---|---|
| 748,894 | Trump | Jan. 5, 1904 |
| 1,528,995 | Singer | Mar. 10, 1925 |
| 1,639,967 | Reader | Aug. 23, 1927 |
| 1,840,857 | Testrup et al. | Jan. 12, 1932 |
| 1,973,270 | Schulwitz | Sept. 11, 1934 |
| 1,985,250 | Goss et al. | Dec. 25, 1934 |
| 2,077,346 | Voskamp | Apr. 13, 1937 |
| 2,100,907 | McGehee et al. | Nov. 30, 1937 |
| 2,363,281 | Arnold | Nov. 21, 1944 |

FOREIGN PATENTS

| Number | Country | Date |
|---|---|---|
| 46,340 | France (1st addition to 771,258) | Feb. 10, 1936 |
| 445,065 | Great Britain | Apr. 2, 1936 |